UNITED STATES PATENT OFFICE.

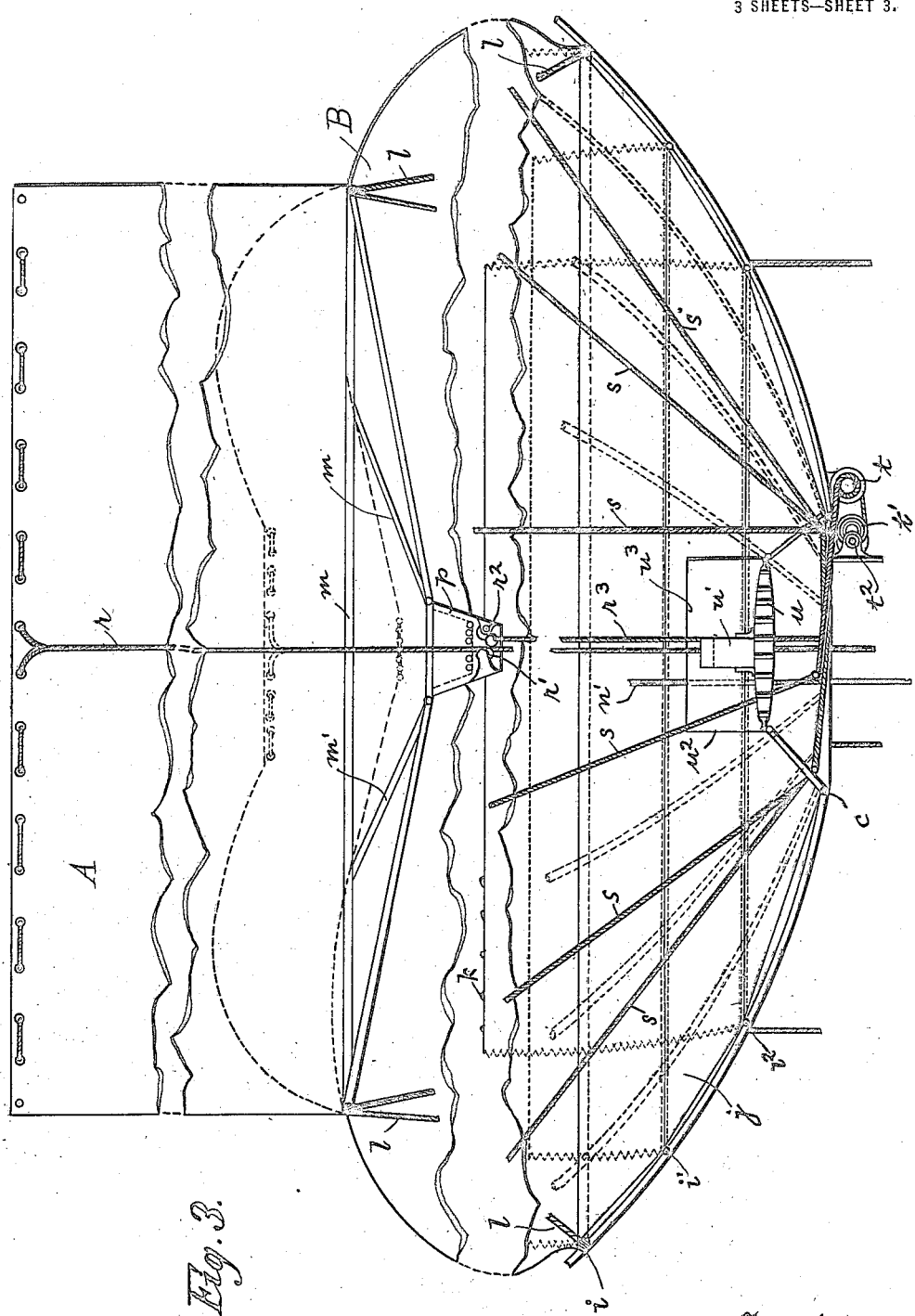

GEORGE FRANCIS MYERS, OF NEW YORK, N. Y., ASSIGNOR TO MYERS AIRCRAFT CORPORATION, A CORPORATION OF DELAWARE.

AIRCRAFT.

1,419,507. Specification of Letters Patent. Patented June 13, 1922.

Original application filed September 20, 1905, Serial No. 279,281. Divided and this application filed December 6, 1916. Serial No. 135,337.

*To all whom it may concern:*

Be it known that I, GEORGE FRANCIS MYERS, a citizen of the United States, and residing at New York city, in the county of New York and State of New York, have invented a new and useful Aircraft, of which the following is a specification.

My invention relates to certain new and useful improvements in aircraft, and is especially concerned with the safety thereof; it comprises certain novel constructions and combination of parts as hereinafter described and specifically pointed out in the claims.

This application is a division of application 279,281, filed Sept. 20, 1905.

In the accompanying drawings:

Fig. 3 represents a fragmentary view of the upper and lower parts of the safety device, and further illustrates the relation of the safety device to its compartment in which it is nested when closed, and also its relation to the operating rope mechanism and to the device employed for placing the safety device in action.

Similar numerals of reference indicate similar parts throughout the several views.

Figure 1:
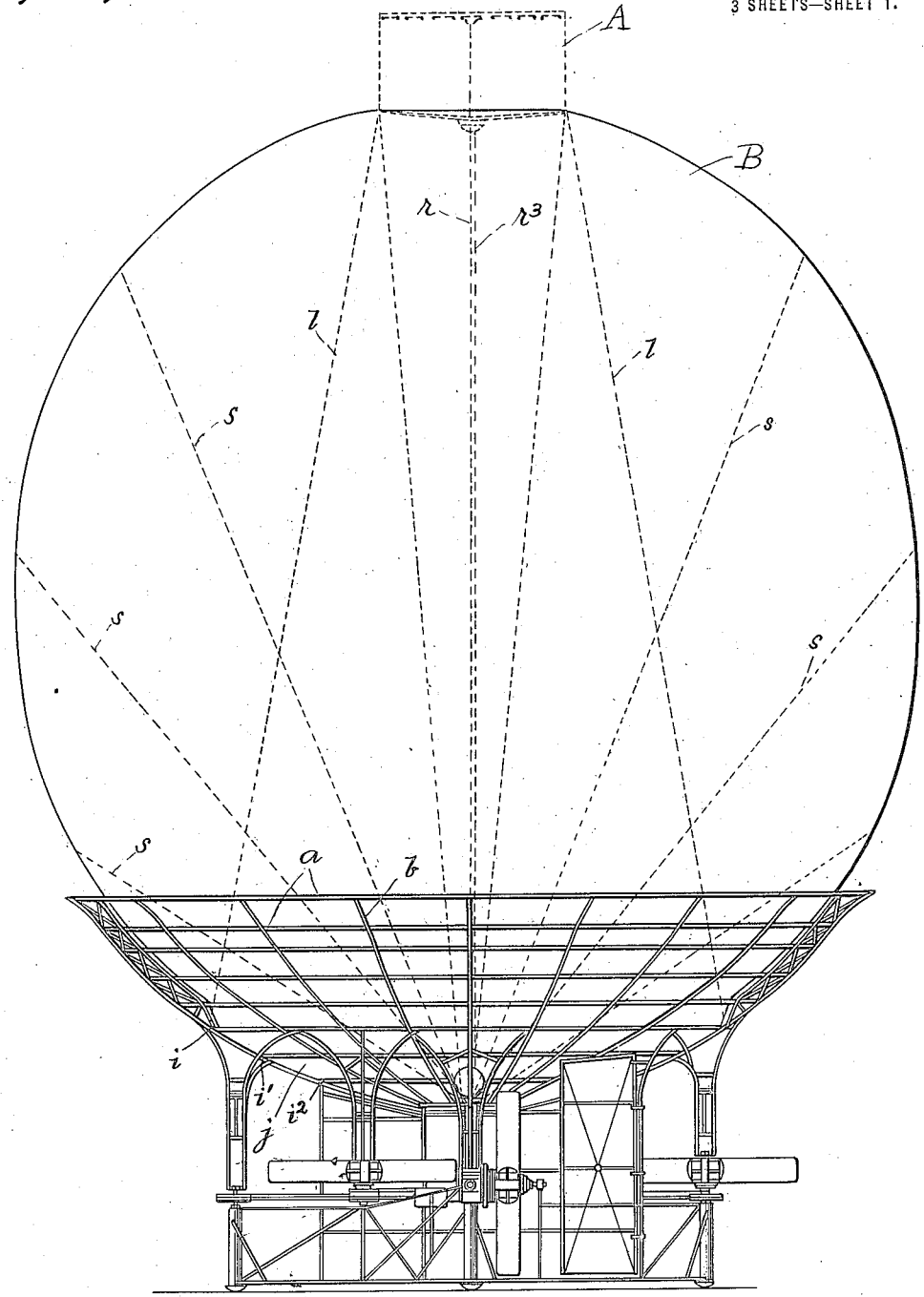
Fig. 1 is a side elevation of a machine embodying my invention with the safety device fully extended.
Figure 2:
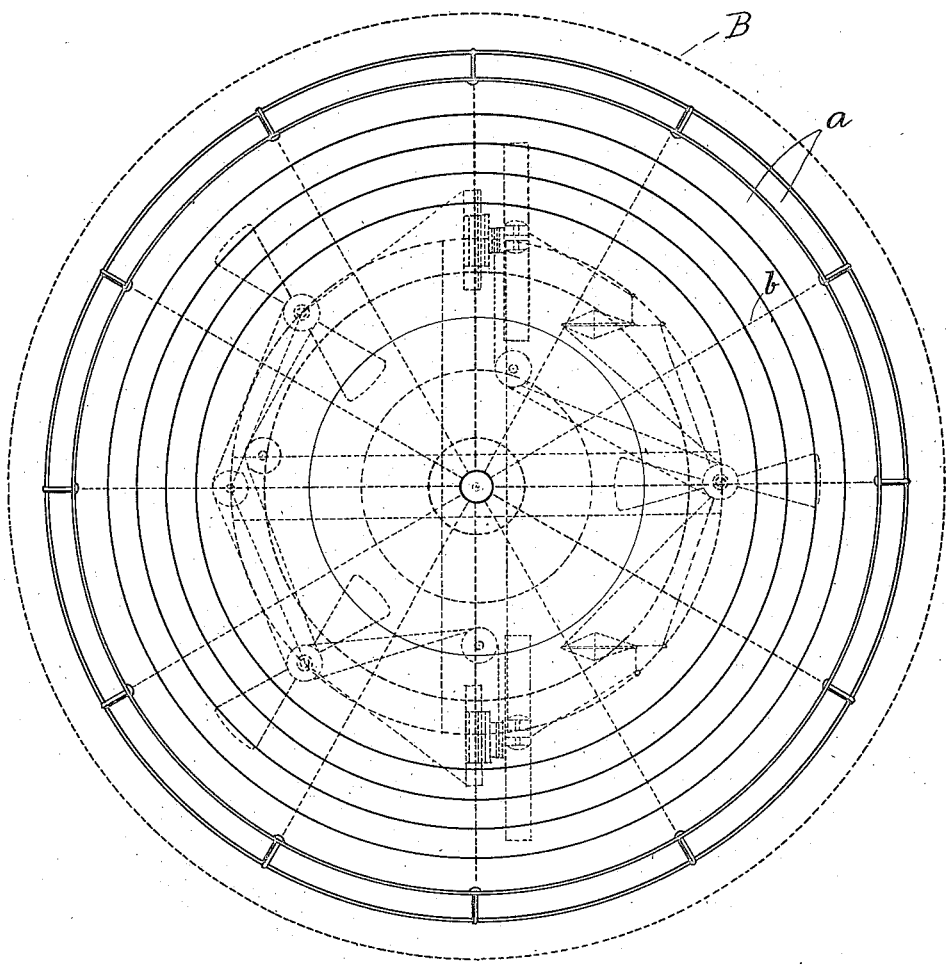
Fig. 2 is a plan view of the machine, the safety device being shown in its extended position in dotted lines.

Referring to the drawings which show the preferred form of my invention, it will be noted that the safety device is here shown attached to a vehicle intended more particularly to fly through the air, and is in the form of a balloon forming an internal parachute. The vehicle or aeroplane consists of a number of annular planes $a$ and $v$ arranged in series one above the other and strongly braced by a series of stays $b$; and is provided with suitable rudders; all as more particularly pointed out in the said companion application.

Below the series of annular planes is located a series of rings $i$, $i'$, $i^2$, constituting a compartment, within which the upper part of the balloon is adapted to be nested when the balloon is collapsed or deflated. The upper part of the balloon is connected to the topmost ring $i$ of this series, as is shown more fully in Fig. 3, and the space between the rings covered with fabric $j$ or the like, so as to form a bowl-shaped aeroplane, while at the same time serving as the lower part of the balloon structure, all adjacent parts or sections of this bowl-shaped compartment being at dihedral angles one to the other. I contemplate fastening this bottom $j$ to the framework, by releasable fasteners, as indicated at $k$, and to make it up in sections, so that it can be readily and quickly stripped from the rings either in part or entirely; the releasable fasteners may operate like ordinary glove fasteners, and may be either manually operated by pulling off the covering by hand or automatically as described, and, in the event of any sudden tendency of the flying machine to fall when the balloon or safety device is deflated, the inrushing air will lift up the balloon, thus converting it into a parachute within the series of annular planes. These planes are preferably propelled by suitable propelling screws as shown, one on either side of the longitudinal center line of the vehicle; and the front and sides of the vehicle may be raised by the horizontally moving propellers. Or the vehicle may be raised by the said horizontally moving propellers alone or in conjunction with the said balloon, or the said planes. Thus there will be a triple sustentation system: of aeroplanes with suitable propellers; of sustaining propellers; and of a balloon. And the last two may use the said forwardly driving propellers also.

The upper or main body portion of the said balloon is attached to the ring $i$ by means of ropes $l$, as indicated. These ropes lead upward and are attached to a top ring $m$ connected by braces $m'$ to an inner ring $n$ which forms the top part of a funnel-shaped guide $p$. Around about the ring $m$ is fastened a cylindrical valve A constituting a continuation of the main body portion B of the balloon. This cylindrical valve is provided with a shirr-string or draw-string $r$ which passes downward through the center of the balloon and out through the ring $c$, so as to be within the reach of the operator. By pulling upon the cord $r$, the operator can partially or almost entirely close the valve A, as is indicated in dotted lines in Fig. 3. Normally the cord $r$ is clamped between the stationary wedge $r'$ and the movable cam $r^2$, located in the funnel-shaped guide $p$, the cam $r^2$ being provided with a spring for causing it to exercise a clamping action upon the cord. $r^3$ indicates a releasing cord for throwing the clamping cam $r^2$ out of operation, when desired. By means of the rope $r$ the constricted part of the valve can be drawn well down into the funnel-shaped guide, which is closed at the bottom except for the openings through which the ropes or cords $r$ and $r^3$ pass. It will, therefore, be apparent that, when the mouth of the valve is thus drawn down into the funnel, the rarefied air or gas has practically no chance to escape from the balloon.

The deflation of the balloon is effected by a plurality of hauling ropes $s$ attached to its main body portion at symmetrical points. These hauling ropes pass through small eyes or similar guides attached to the ring $c$, as shown, and are wound upon a drum or barrel $t$ which may be operated by any suitable motor, as, for instance, a spring motor $t'$ adapted to be thrown in and out of operation by means of a hand lever $t^2$. By operating the spring motor or its equivalent, the ropes $s$ may be wound upon the drum and the balloon deflated so as to bring it ultimately into the compartment of the machine provided with the covering $j$.

Carried by the ring $c$ is the furnace $u$ which has for its function to heat the air of the balloon, thereby rarefying the air and permitting it to lift the flying machine. I have not thought it necessary to illustrate any specific construction of furnace, for this purpose inasmuch as any adequate furnace will suffice. In addition to the furnace itself, however, I prefer to have it heat a vessel $u'$, containing water, so that steam will be admitted into the interior of the balloon, its admission still further increasing the rarefaction of the air. The furnace, because of its location, is within the easy reach and control of the operator, standing below. A shield of board asbestos $u^2$ having a top covering $u^3$ or wire gauze may be provided for the furnace to keep it out of contact with the walls of the deflated balloon.

The operation of the machine is substantially as described in the said companion application where it is shown that:

In case of danger, as when the machine is falling, the operator may push up the hoisting rod or rods $n'$ and consequently the main body portion B of the balloon, to which the said hoisting rod is attached in any convenient manner, and then turn on and ignite the furnace burner, thereby rarefying the air in the balloon and gradually reducing the volume of rarefied air until the machine reaches the ground; or, if he be descending too rapidly to utilize the furnace effectively, he may strip off sections of the covering $j$ of the balloon compartment (or, in a still more rapid descent, this stripping operation will be effected automatically), thereby admitting the inrushing air which will inflate the balloon quickly, so that the balloon will itself constitute a parachute interior to the series of annular planes. The quicker the rate of descent of the machine, the quicker will the balloon expand under these conditions, and the heat of the furnace may also be turned on, if desired.

Referring further to the factor of safety, it is evident that, as long as the forwardly driving propellers are kept rotated with sufficient rapidity, and the forward part of the machine tilted slightly upward, the machine cannot drop.

Should the engines stop altogether, the upper part of the balloon may be quickly lifted, the furnace burners lighted, thereby rarefying the air, and the machine ceases to descend and will even rise. Should the furnace fail to work, the whole bottom of the balloon may, as described, be thrown open, by hand or automatically, so as to form an immense internal parachute. In this connection it may be again pointed out that it is not necessary that the sections of the covering $j$ be stripped off by hand, inasmuch as when the descent becomes dangerously rapid, the upward pressure of the air may be relied upon either to tear the sections from their fastenings, or to tear the sections themselves (the fabric of which they are composed being of less strength than the walls of the main body portion of the balloon), and will lift the balloon and inflate it as a parachute.

In Serial No. 621,233 filed January 29, 1897, is shown a similar arrangement or combination as herein described: an aeroplane system with means for salvaging the same in case of accident; and consisting essentially of a parachute or saftey device or balloon with heaters, and suitable means for releasably attaching the same to the vehicle. Also in Serial No. 210,486, filed May 31, 1904 (part of which became Patent 995,550) the same arrangement was originally shown; but the bottom of the said safety device or balloon was so constructed as to be manually operable by means of valves. In said 279,281, (part of which became Patent 1,226,985) and in the present application, the same system of aeroplanes and safety device as in the aforementioned companion applications is shown; but in addition thereto the said valves are so arranged as to be not only manually operable but automatically operable also.

As my invention is, in many of its aspects, generic I do not limit myself to the particular construction shown, but also contemplate the employment of such equivalents for the several elements as fairly fall within the scope of the claims.

In the same connection I may say that I do not limit myself to the shape of the balloon, nor to the employment of any particular gaseous medium for raising or inflating the balloon, nor to any particular form of propelling or lifting or stabilizing mechanism. Therefore it will be understood that I may make various changes in the form, proportion, size and detail of the several structures shown, the number and position of certain elements used, as well as the character of the motive power employed, without departing from the spirit of the invention.

I claim:

1. An aircraft comprising a compartment, a safety device releasably secured to and normally located within the compartment, and means operative upon rapid descent of the craft for automatically releasing the safety device for the purpose set forth.

2. An aircraft comprising supporting surfaces having portions displaced in a fore and aft direction from each other, a compartment disposed between said fore and aft portions and a parachute safety device normally retained in said compartment in an inoperative position but capable of a quick release from said compartment for the purpose set forth.

3. Aircraft comprising an aeroplane supporting surface, said surface having an opening in the middle thereof a compartment within said opening and a parachute like safety device normally retained in said compartment in an inoperative position but capable of quick release for the purpose set forth.

4. An aircraft comprising supporting surfaces having portions displaced in a fore and aft direction from each other, a compartment disposed between said fore and aft portions and a lighter-than-air supporting element normally inoperative and collapsed and disposed within said compartment but capable of rapid inflation and release from said compartment for the purpose set forth.

5. An aircraft comprising a plurality of annular aeroplanes superposed one above the other, a nest-like compartment enclosed within said annular planes and a parachute or safety device normally retained in said compartment in an inoperative position but capable of quick release therefrom for the purpose set forth.

6. An aircraft comprising means for sustentation and for propulsion through the air a compartment having a wall which may be torn asunder by the rush of air and a parachute like safety device normally retained in an ineffective position within said compartment whereby upon rapid descent of the craft the protecting wall of the compartment is automatically torn asunder and the parachute brought into operation for the purpose set forth.

7. In an aircraft, means for accommodating an operator, a dual system of sustentation one comprising a series of lifting propellers placed triangularly about the said means and the other comprising a balloon, and means for controlling the lifting effort of each of the same independently one of the other.

8. In an aircraft, means for accommodating an operator, a triple system of sustentation one comprising a series of superposed sustaining aeroplanes a second comprising a series of sustaining propellers placed triangularly about the said means and the third comprising a balloon mounted opposite the body portions of the said areoplanes, and means for controlling each of the same indepently one of the other.

9. In an aircraft, means for accommodating an operator, a series of annular aeroplanes, a collapsible balloon nested in a compartment within the series of the said aeroplanes, and means for bringing the said balloon into action.

10. The combination with an aeroplane comprising a compartment, of a balloon, and of means for secreting the flexible part of the balloon within said compartment and away from contact with the dynamic airstream.

11. A flying machine having a car compartment at its lower part, a compartment above the car compartment for stowing a deflated balloon, a balloon, and an outlying series of planes constituting an aeroplane.

12. A flying machine provided with an aeroplane, a balloon, and a lenticular or lens-shape compartment to stow said balloon when deflated and conforming to the curvature of the balloon when inflated.

13. A flying machine provided with an aeroplane, a balloon and a compartment for stowing the balloon when deflated, the bottom of the said compartment forming an aeroplane.

14. The combination with a flying machine, of a balloon, a housing beneath the balloon, and a framework about the same, a rope running from the top of the balloon when deflated over the upper part of the framework and down to the housing, means by which said rope may be shortened and means by which the top of the balloon raised.

15. An aircraft comprising a plurality of superposed aeroplane surfaces having portions mounted forwardly of the center of gravity of the vehicle and having portions mounted rearwardly thereof, and an auxiliary surface or parachute releasably attached to the vehicle and normally lying inert adjacent to a portion of the vehicle between the said forwardly and rearwardly sets of superposed aeroplane surfaces.

16. An aircraft comprising a car, a pair of superposed aeroplanes, a motor, a propeller, means for turning the vehicle on its longitudinal its transverse and its vertical axis, and a salvaging device or parachute mounted when inactive approximately adjacent a vertical line passing through the center of lift of the said superposed aeroplanes or extensions thereof.

17. An aircraft comprising a car, an aeroplane, a plurality of driving motors, propellers for the said motors, means for turning the vehicle on its longitudinal its transverse and its vertical axes, and a salvaging device or parachute mounted when inactive between the said motors.

18. An aircraft comprising a car, means designed to sustain the vehicle in the air, motive power, a pair of propellers driven by the said power, and a salvaging device or parachute mounted when inactive between the said propellers.

19. An aircraft comprising a car, means to sustain the craft in the air, a safety device or parachute secreted on the aircraft in such a manner as not to interfere with the sustaining means during normal operation, and means for automatically releasing and rendering operative said safety device.

20. An aircraft comprising a car, means for sustaining the craft in the air, a safety device or parachute secreted on said car in such a manner as not to interfere with the normal operation of the sustaining means and devices for automatically releasing and rendering operative said safety device.

21. An aircraft comprising a car, means designed to sustain the vehicle in the air, a safety device or parachute, a receptacle in which the said parachute is secreted, and means permitting the lower portion of the said receptacle to be violently torn asunder by the impinging air when the descent becomes dangerously rapid.

22. In an aeroplane, the combination of aeroplane sustaining surfaces, a compartment, a balloon-like safety device carried within the compartment and normally retained therein, means for releasing the balloon-like safety device at the will of the operator and means for inflating the balloon-like safety device.

23. In an aeroplane, the combination of aeroplane supporting surfaces, a compartment, a balloon-like safety device normally retained within said compartment, means for releasing said balloon from its compartment and means for hastening the inflation of said balloon comprising devices for heating and rarefying the air therewithin.

24. In an aeroplane, the combination of an aeroplane supporting surface, a safety device releasably secured to said aeroplane, and means for automatically releasing the safety device for the purpose set forth.

GEORGE FRANCIS MYERS.